(12) United States Patent
Toshimitsu et al.

(10) Patent No.: US 7,028,077 B2
(45) Date of Patent: Apr. 11, 2006

(54) COMMUNICATION SYSTEM AND COMMUNICATION METHOD

(75) Inventors: Kiyoshi Toshimitsu, Yokohama (JP); Masahiro Takagi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 125 days.

(21) Appl. No.: 10/359,690

(22) Filed: Feb. 7, 2003

(65) Prior Publication Data

US 2003/0154188 A1 Aug. 14, 2003

(30) Foreign Application Priority Data

Feb. 8, 2002 (JP) ............................. 2002-031872

(51) Int. Cl.
*G06F 13/00* (2006.01)

(52) U.S. Cl. ...................... 709/214; 709/216; 709/242; 709/319

(58) Field of Classification Search ................ 709/214, 709/216, 242, 319
See application file for complete search history.

(56) References Cited

U.S. PATENT DOCUMENTS

| 5,727,002 | A | * | 3/1998 | Miller et al. ................. 714/748 |
| 5,809,287 | A | | 9/1998 | Stupek, Jr. et al. ........... 703/22 |
| 6,035,423 | A | | 3/2000 | Hodges et al. ................. 714/38 |
| 6,073,180 | A | * | 6/2000 | Onoda et al. ................. 709/234 |
| 6,119,165 | A | | 9/2000 | Li et al. ....................... 709/229 |
| 6,195,678 | B1 | * | 2/2001 | Komuro ....................... 709/202 |
| 6,205,415 | B1 | * | 3/2001 | Butts et al. .................... 703/27 |
| 6,243,719 | B1 | * | 6/2001 | Ikuta et al. ................... 707/204 |
| 6,304,909 | B1 | | 10/2001 | Mullaly et al. .............. 709/232 |
| 2001/0034770 | A1 | * | 10/2001 | O'Brien ....................... 709/212 |
| 2001/0049740 | A1 | * | 12/2001 | Karpoff ....................... 709/231 |
| 2003/0231661 | A1 | * | 12/2003 | DePietro et al. ............ 370/474 |

FOREIGN PATENT DOCUMENTS

| CN | 1323117 | 11/2001 |
| JP | 2001-159975 | 6/2001 |
| JP | 2001-256045 | 9/2001 |
| WO | WO 01/15394 | 3/2001 |

OTHER PUBLICATIONS

S. Floyd, et al., IEEE/ACM Transactions on Networking, vol. 3, No. 4, XP-000520857, pp. 365-386, "Link-Sharing and Resource Management Models For Packet Networks", Aug. 1, 1995.

* cited by examiner

*Primary Examiner*—Reba I. Elmore
(74) *Attorney, Agent, or Firm*—Oblon, Spivak, McClelland, Maier & Neustadt, P.C.

(57) ABSTRACT

A communication system includes a first network on which a file server and an access point are connected via a first communication link and a second network on which the access point and a terminal are connected via a second communication link. The terminal establishes a connection with the access point to access the file server. The file server stores a file to be downloaded. The terminal accesses the file server through the access point to request the file. The terminal then selects a download process from one of a foreground process, background process and postponement process, and executes the download process to download the file from the file server.

8 Claims, 6 Drawing Sheets

COMMUNICATION SYSTEM AND COMMUNICATION METHOD

CROSS-REFERENCE TO RELATED APPLICATIONS

This application is based upon and claims the benefit of priority from the prior Japanese Patent Application No. 2002-31872, filed Feb. 8, 2002, the entire contents of which are incorporated herein by reference.

BACKGROUND OF THE INVENTION

1. Field of the Invention

The present invention relates to a download control in a communication system, more particularly, the present invention relates to a communication system and method of controlling a process for downloading a security measure file.

2. Description of the Related Art

Upon development of network technologies in recent years, many PCs (personal computers) are connected to networks. Accordingly, damages due to computer viruses have increased, and security measures have gained importance.

As security measures for PCs, security software such as an anti-virus program is normally installed in a PC. Also, it is indispensable for security measures for PCs to apply a security patch that fixes bugs of an OS (Operating System) and applications.

Jpn. Pat. Appln. KOKAI Publication No. 2001-159975 discloses an anti-virus method that executes an anti-virus program periodically, and updates the anti-virus program itself if its version is not the latest one. Taking, as an example, one of anti-virus programs which run on PCs, a terminal updates an automatic update program to access a data file distribution server so as to get a data file of the latest version upon connection to a network.

The size of an anti-virus program and the data size of an update difference of a data file used by that program are increasingly getting bigger. When PCs are connected via a wired LAN (Local Area Network), a sufficiently broad communication band can be assured. In this case, the time required for an update process for the program and data file is short. The update process can be done without stress before the user starts a communication.

When a wireless communication is conducted using a wireless LAN, portable phone, or when a wired communication is conducted based on dial up access, a communication band broad enough for the update process cannot always be assured. Hence the update process is executed while a sufficient communication band cannot be assured. It is time-consuming, and the user gets tired of waiting for the result of the update process.

As a solution to this problem, in a security measure method proposed by Jpn. Pat. Appln. KOKAI Publication No. 2001-256045, the terminal does not take any security measures other than communications via a security server. Packets addressed to the terminal are received by the security server and analyzed to check and remove viruses. This security measure method does not require any update process on the terminal side, and does not cause any problem of the communication bandwidth.

However, since the security server bears a heavy load in this method, if the number of terminals increases, the processing performance of the security server itself cannot catch up, and the available communication bandwidth is narrowed down. Also, when the security server breaks down due to overloads imposed by, e.g., so-called DoS (Denial of Service) attacks, communications may be interrupted.

Therefore, it is desirable to take security measures not only in the security server but also in respective terminals.

BRIEF SUMMARY OF THE INVENTION

It is, therefore, an object of the present invention to provide a security measure method and system, which can update security software and a data file installed in a terminal such as a PC, portable phone, by an optimal method corresponding to a communication bandwidth without impairing user's convenience.

In order to achieve the above object, a download control method in a communication system is provided. The system includes a first network on which a file server and an access point are connected via a first communication link and a second network on which the access point and a terminal are connected via a second communication link. The terminal establishes a connection with the access point to access a file on the file server. The download control method comprises accessing from the terminal to the file server through the access point to request the file, selecting a download process from one of a foreground process, background process and postponement process, and executing the download process to download the file from the file server to the terminal.

DETAILED DESCRIPTION OF THE INVENTION

First Embodiment

Figure 1:
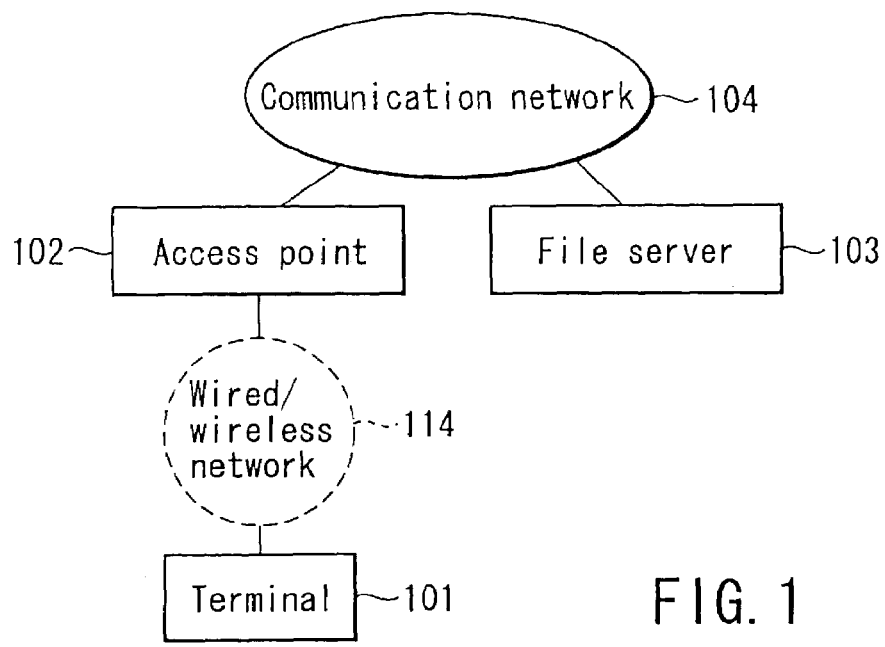
FIG. 1 is a block diagram depicting a schematic arrangement of a communication system according to first, second, and third embodiments of the present invention.

With reference now to FIG. 1, there is shown a block diagram depicting a schematic arrangement of a communication system according to a first embodiment of the present invention.

A communication system according to this embodiment includes a terminal 101 that the user uses, an access point 102 which communicates with the terminal 101 via a wired/wireless network 114, a file server 103 which provides a data file of security software to the terminal 101, and a communication network 104 which couples the access point 102 and file server 103.

The terminal 101 is a computer which can execute a program for security measures, and can make a wired or wireless communication. The terminal 101 may be any one of a desktop PC, notebook PC, portable terminal (PDA (Personal Digital Assistant), and portable phone.

In the terminal 101, an anti-virus program that takes a computer virus (to be simply referred to as "virus" hereinafter) has been installed in advance as security software upon purchasing the terminal 101. The anti-virus program finds and removes a virus which is to about to invade or has invaded a computer on the basis of data stored in an anti-virus data file (to be referred to as a "pattern file" hereinafter). The terminal 101 executes an update process of the pattern file included in the anti-virus program, and updates it to the latest one so as to be able to take measures against the latest viruses.

The access point 102 communicates with the terminal 101 via a wired or wireless communication. The terminal 101 communicates with other computers on the network via the access point 102. The access point 102 may be a gateway server or router in a LAN environment. The access point 102 may be a modem, gateway server, and authentication server on the provider side in case of a provider. Also, the access point 102 may be a base station if the terminal 101 is a portable phone.

The file server 103 stores the latest pattern file. An update server program runs on the file server 103. This program provides a remote service that transmits information of the latest version number of the pattern file and the latest pattern file itself to the terminal 101 in accordance with a request from the terminal 101.

Since the pattern file which has been installed in the terminal 101 before shipping (or upon purchase) cannot cope with the latest viruses, it is necessary for them to be updated continually.

Figure 2:
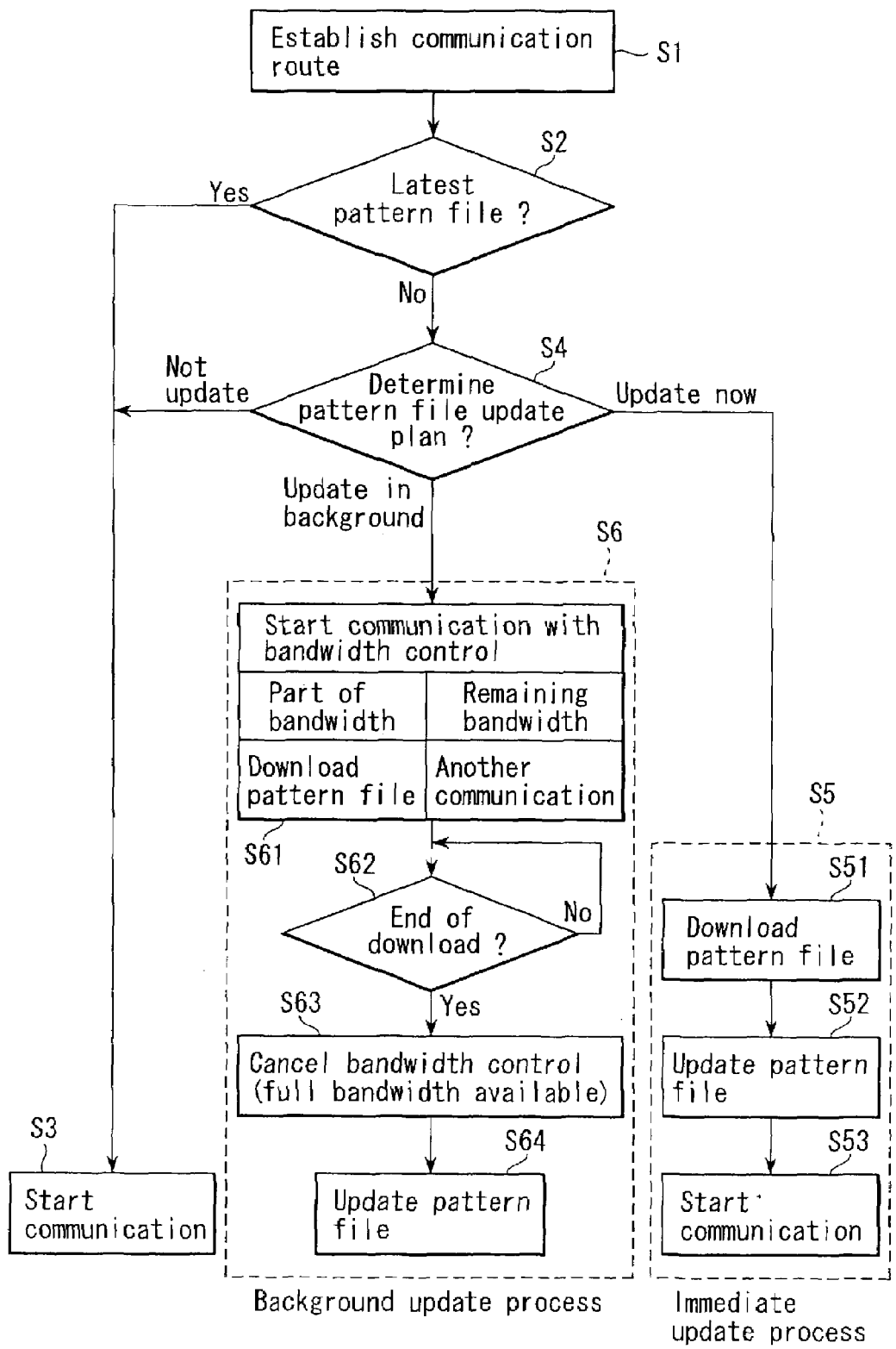
FIG. 2 is a flow chart of a pattern file update process in a terminal in the communication system according to the first embodiment.

Referring to FIG. 2, there is shown a flow chart for explaining a pattern file update process. This process is executed by the terminal 101.

Before the pattern file update process, the terminal 101 establishes a communication with the access point 102 (step S1). This process includes an assignment of an IP address to allow communications on the TCP/IP (Transmission Control Protocol/Internet Protocol) level.

After a communication between the terminal 101 and access point 102 is established, the terminal 101 temporally inhibits communications by other programs other than the anti-virus program, to prevent virus acquisition during the update process. Note that this step may be abbreviated.

The terminal 101 requests the file server 103 to send the latest version number of the pattern file. The latest version number of the pattern file stored in the file server 103 is compared with the version number of the pattern file currently installed in the terminal 101 (step S2).

If the two version numbers match, i.e., the terminal 101 currently has the pattern file of the latest version, the update process is not necessarily executed. Flow in turn proceeds to step S3. In step S3, communications by other programs other than the anti-virus program are started. It is the same case if the version number of the pattern file in the file server 103 is older than the version number of the current pattern file in the terminal 101.

If a pattern file newer than that of the terminal 101 is present in the file server 103, the terminal 101 presents update process plans of the pattern file to the user and prompts him or her to select one of them (step S4). The "update process plans" refer to some timings for initiating an update process or to some manner in which an update process is executed. In the embodiments of the present invention, the plans include, but are not limited to, at least three plans, e.g., "update now", "update in background", and "not update".

The user who wants to preferentially take security measures even if the update process of the pattern file is time-consuming can select "update now" in step S4. In this case, the update process is executed immediately at step S5. All other communications are interrupted until the update process is completed. Hence, the terminal 101 is prevented from getting viruses even when new viruses that the old pattern file cannot cover are widespread on the network. Upon completion of the update process, communications by other programs are permitted. The step S5 comprises step S51 of downloading the latest pattern file, step S52 of updating a pattern file currently used in the terminal 101 with the latest pattern file, and step S53 of permitting and starting communications by other programs.

On the other hand, the user who wants to start communications immediately can select "not update" (step S4). In this option, flow proceeds to step S3, and communications by other programs are permitted immediately. Although sufficiently high security is not assured for this option, it is effective when a communication time is very short (e.g., when the user wants to send only one mail message) and a security program is hardly expected to occur.

The user who wants to start a communication immediately and also assure certain security can select "update in background" (step S4). If this option is selected, flow proceeds to step S6, wherein a background update process is executed, and communications by other programs are permitted immediately. Security during the update process of the pattern file cannot be assured for this option, but high security can be assured after the update process and, in many cases, sufficiently high security can be assured. If the user is to finish a communication before completion of the update process of the pattern file, a message indicating that a communication will be automatically terminated after completion of the update process of the pattern file, and the update process continues.

Upon executing the background update process, if the full communication bandwidth between the terminal 101 and access point 102 is occupied by the pattern file update process, user's convenience is impaired because the communication speed of other programs gets low. The bandwidth is controlled during the steps of S61 to step S63, so that the pattern file update process occupies a partial communication bandwidth, and the remaining bandwidth is open to communications by other programs.

Note that the term "bandwidth" refers to the one which is used by the terminal 101 in a communication with the access point 102 via the wired/wireless network 114 as shown in FIG. 1. Whether that the bandwidth is broad or narrow corresponds to whether that the communication speed is high or low. In other words, the broader the communication bandwidth, the higher the communication speed as the transmitting data amount per unit of time is increased.

Figure 3:
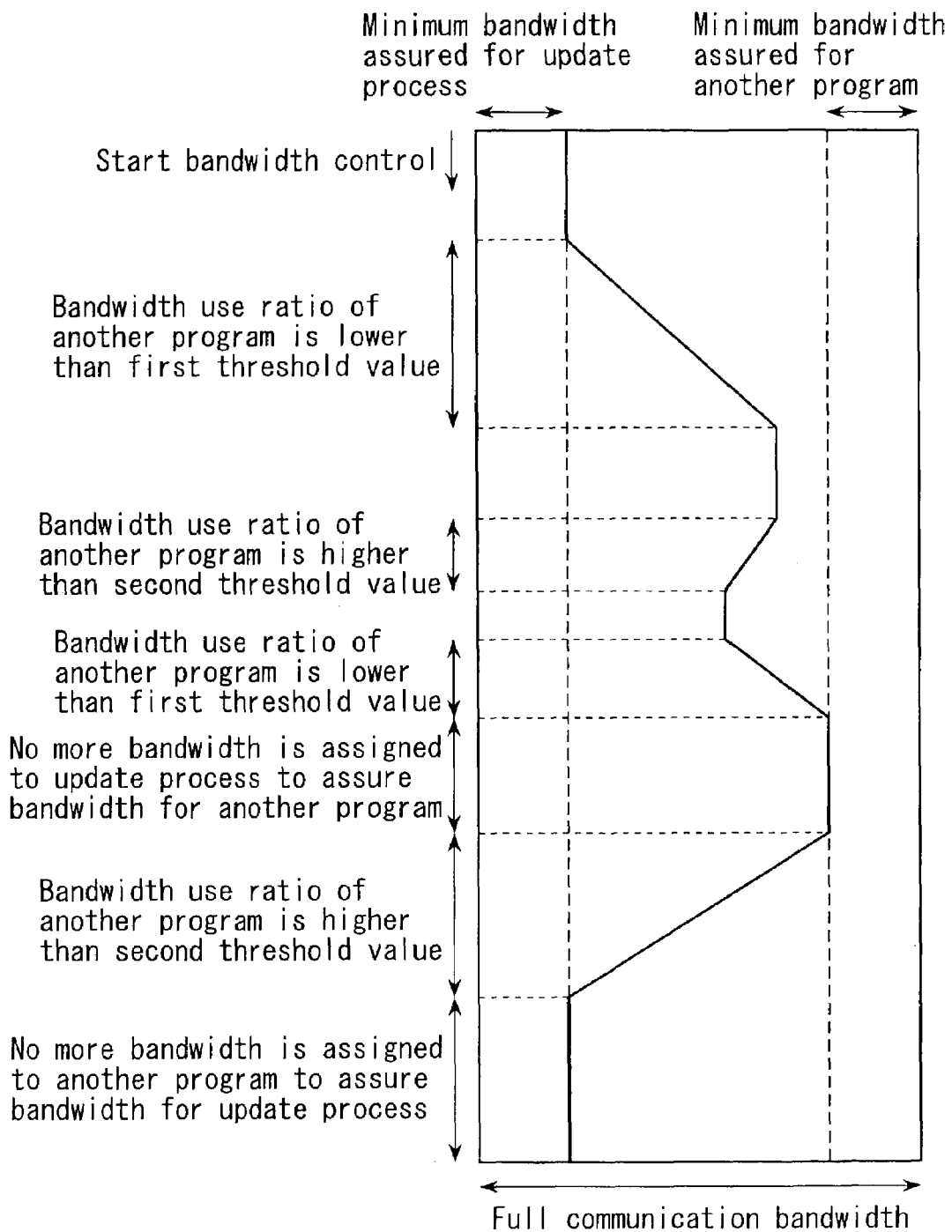
FIG. 3 is a view for explaining changes in frequency band for another program and in that for an update process by bandwidth control.

In step S61, the communication bandwidth occupied for use in the pattern file update process may be dynamically controlled. For example, the bandwidth may be controlled in accordance with a proportion of bandwidth occupied for communications by other programs within the entire communication bandwidth, as is understood from FIG. 3. In more detail, the following control is made. The use ratio of a bandwidth assured for communications by other programs is monitored during the period of downloading the pattern file. If the use ratio is lower than a first predetermined threshold value, a communication bandwidth assigned to the pattern file update process is temporarily increased. Note that a predetermined minimum bandwidth is assured all the time for other programs. Conversely, if the use ratio is higher than a second threshold value (larger than the first threshold value), a communication bandwidth assigned to the pattern file update process is decreased (a minimum bandwidth assigned to the pattern file update process is assured all the time).

An alternative bandwidth control may be a collaboration with the file server 103, serving as a source of pattern files. For example, the terminal 101 informs, at given time intervals, the file server 103 of information indicative of a communication bandwidth to be assigned to the pattern file update process. The file server 103 adjusts the packet amount per unit of time to be sent to the terminal 101 according to the information informed.

The bandwidth control method varies depending on a transmission method over a wired/wireless network 114 through which the terminal 101 and access point 102 are connected. For example, if a communication medium of the network 114 is wireless, and a wireless transmission method based on TDMA (Time Division Multiple Access) is employed, the following implementation may be adopted. That is, the bandwidth control of a wireless section is made by controlling the number of slots assigned to the pattern file update process, and that to be assigned to other programs, thus consequently adjusting the packet amount per unit of time to be sent from the file server 103.

Alternatively, if a wireless transmission method based on FDMA (Frequency Division Multiple Access) or CDMA (Code Division Multiple Access) is employed, the bandwidth control may be implemented by controlling the number of channels to be assigned to the pattern file update process (the number of frequency bands in case of FDMA; the number of codes in case of CDMA).

If CSMA (Carrier Sense Multiple Access) is employed as a transmission method for a wireless section, the bandwidth control may be implemented by controlling the priority of a back-off process between the pattern file update process data and data for other programs.

Note that the bandwidth control is not limited to the aforementioned methods, and any other methods may be used.

In this embodiment, the pattern file is updated after a communication on the TCP/IP level is established. However, the communication on the TCP/IP level is not always indispensable. For example, if the access point 102 and file server 103 are integrated, the pattern file update process may be made in process of communication establishment based on TCP/IP.

According to the first embodiment described above, even when the pattern file update process is time-consuming, the user can select in advance the way to download a pattern file, thereby avoiding user's convenience being impaired.

Note that, it is preferable that a time required for downloading the pattern file is informed to the user, as one of advices on how to decide an update process plan of the pattern file. The time required may be approximated as follows. At the possible occasions, e.g., when the file server 103 is inquired about the version of the latest pattern file, the server 103 reports the size of the latest pattern file in addition to its version to the terminal 101. The time required can be calculated by the terminal 101 with the file size of the pattern file and known communication speed.

Second Embodiment

Since the arrangement of a communication system according to the second embodiment of the present invention is substantially the same as that in the first embodiment, only a difference will be explained below. The difference from the first embodiment is a pattern file update process. The process is automatically planned without having any user's operation.

Figure 4:
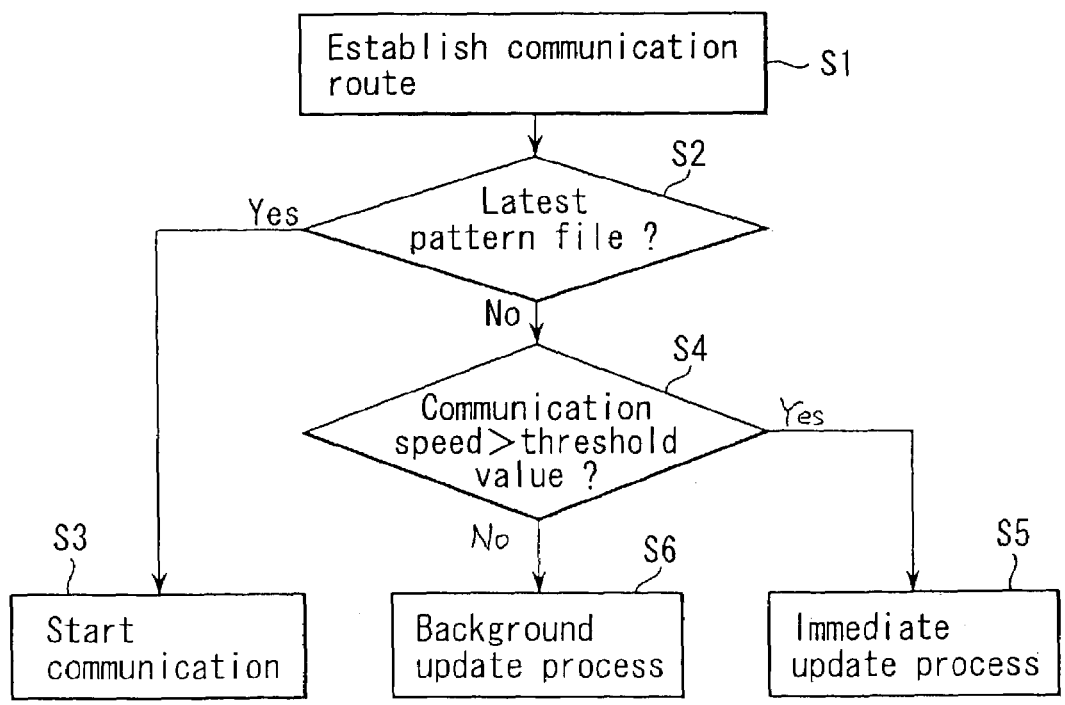
FIG. 4 is a flow chart of a pattern file update process in a terminal in the communication system of the second embodiment.

With reference now to FIG. 4, there is depicted a flow chart for explaining the pattern file update process in this embodiment.

The same process as in the first embodiment is executed until the terminal 101 establishes a communication with the access point 102, and accesses the file server 103 to confirm the latest version number of the pattern file (steps S1 and S2).

If its version of the pattern file of the terminal 101 is older than that of the file server 103, the terminal 101 checks a communication speed between the terminal 101 and the access point 102. The value of a communication speed may be measured in each case or predetermined. In step S4, a pattern file update process plan is determined in accordance with the communication speed.

If the communication speed exceeds a predetermined threshold value, since it is determined that the communication bandwidth is broad enough to make a communication for a pattern file update process, an immediate update process is executed (step S5).

If the communication speed is equal to or smaller than the predetermined threshold value, since it is determined that the communication bandwidth is not enough to execute a pattern file update process, a background update process is executed (step S6). Note that, the immediate update process may be executed in place of the background update process even if the communication speed is equal to or smaller than the predetermined threshold value, in the case where the size of the latest pattern file is tiny.

Furthermore, after an estimated time required to update the pattern file may be displayed so that the user may select a pattern file update process plan as in the first embodiment. Also, an update process plan may be automatically determined based on a threshold value, which is set in advance by the user.

As described above, according to the second embodiment, the terminal 101 automatically determines a pattern file update process plan without the user's intervention. In addition to the advantage equivalent to that of the first embodiment, an operability can be improved.

Third Embodiment

Since the arrangement of a communication system according to the third embodiment of the present invention is substantially the same as that in the second embodiment, only a difference will be explained below. The difference from the second embodiment is that the pattern file update process plan is determined while classifying pattern files in detail according to the version number and the urgent level thereof.

Figure 5:
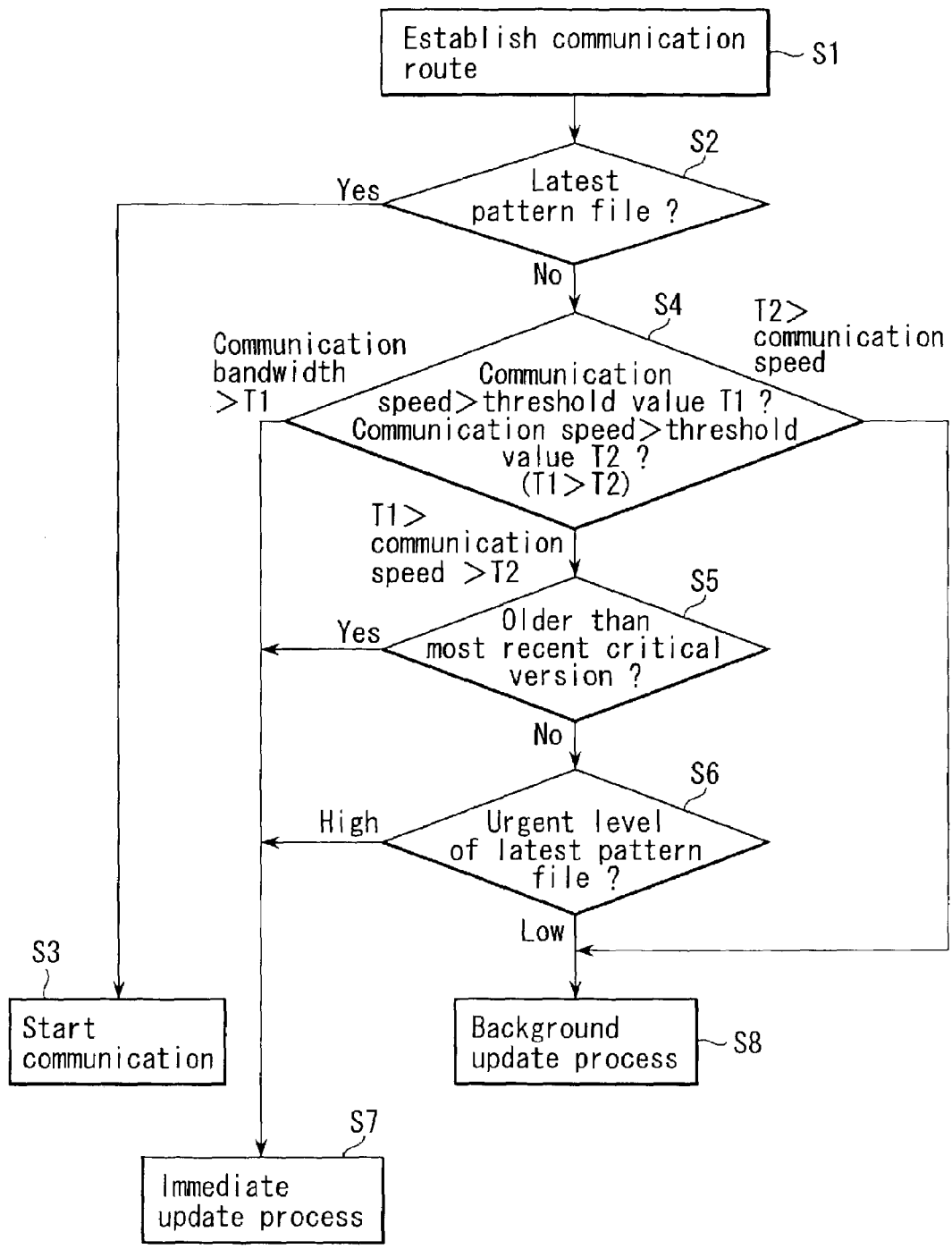
FIG. 5 is a flow chart of a pattern file update process in a terminal in the communication system of the third embodiment.

With reference now to FIG. 5, there is depicted a flow chart for explaining the pattern file update process in this embodiment.

The same process as in the first and second embodiments is executed until the terminal 101 establishes a communication with the access point 102 (steps S1 and S2).

Figure 6:
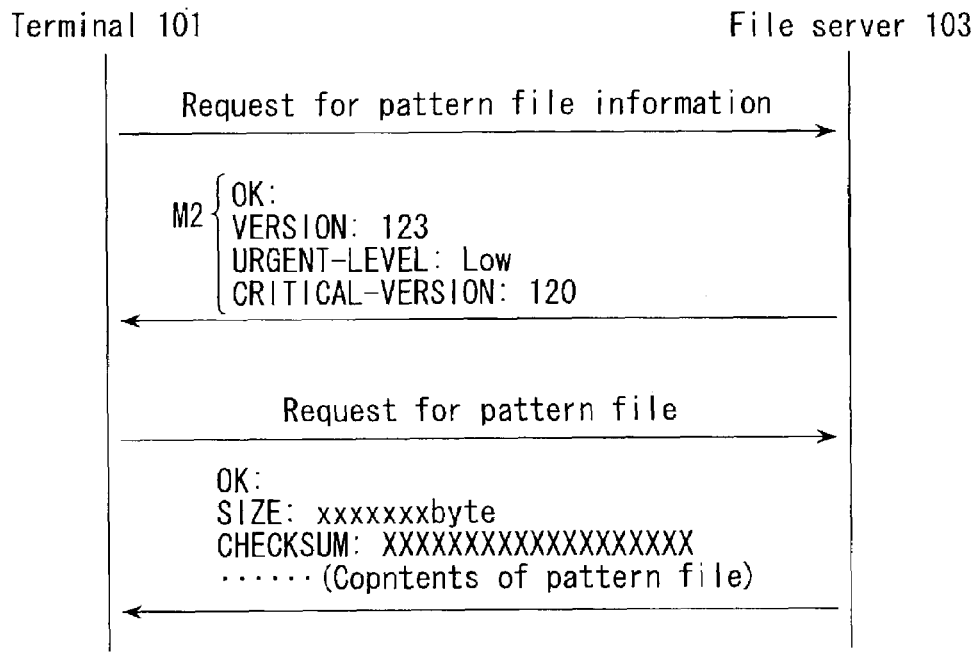
FIG. 6 is a chart for explaining communications between the terminal and a file server in the communication system of the third embodiment.

The terminal 101 updates the pattern file according to a message sequence with the file server 103, as shown in FIG. 6.

The terminal 101 accesses the file server 103 to require a latest pattern file information M1. The information M1 indicates the latest version number of the pattern file, its urgent level, and the most recent critical version number. This parameter "urgent level" is set, for each pattern file, by a person such as a network administrator, who installed the pattern file in the file server 103. The urgent level is set high when the pattern file is released to cope with an extremely malicious virus and the administrator wants to make respective terminals update immediately. Otherwise, a low urgent level is set. The number of urgent levels is not particularly limited, but the following description will be given using two levels (high level or low level). The urgent level and most recent critical version number are described in a critical file which is prepared to have the same name as but a different extension from a pattern file. However, the present invention is not limited to such file.

As shown in FIG. 6, the file server 103 replies a message M2 which indicates the latest version number (VERSION field in FIG. 6) of the pattern file, the urgent level (URGENT-LEVEL field) of the pattern file, and the most recent critical version number (CRITICAL-VERSION field), in response to the request of pattern file information M1 from the terminal 101.

If the pattern file of the terminal 101 is older than that distributed by the file server 103, the pattern file should be updated. The terminal 101 checks the communication speed between the terminal 101 and the access point 102. In step S4, the terminal 101 selects an update process plan by comparing the communication speed with two threshold values T1 and T2 (T1>T2).

If the communication speed between the terminal 101 and access point 102 is larger than the threshold value T1, the terminal 101 executes an immediate update process (step S7).

If the communication speed between the terminal 101 and access point 102 is smaller than the threshold value T2, the terminal 101 executes a background update process (step S8). In this step S8, the bandwidth control is done as in the second embodiment so as not to impair user's convenience. Note that, the immediate update process may be executed in place of the background update process even if the communication speed is equal to or smaller than the threshold value T2, in the case where the size of the latest pattern file is tiny.

If the communication speed between the terminal 101 and access point 102 falls within the range between the threshold values T1 and T2, the terminal 101 classifies cases using the most recent critical version number (step S5). That is, if the version number of the pattern file of the terminal 101 is smaller than the most recent critical version number, since it is determined that the pattern file is not updated with that with the high urgent level, the terminal 101 executes an immediate update process (step S7).

If the version number of the pattern file of the terminal 101 is larger than the most recent critical version number, the terminal 101 further classifies cases using the urgent level of the latest pattern file (step S6). If the urgent level of the latest pattern file is high, since the terminal 101 is at high risk of acquiring a virus, the terminal 101 executes an immediate update process (step S7). On the other hand, if the urgent level of the latest pattern file is low, since the risk of acquiring a virus is not so high, the terminal 101 executes a background update process (step S8). In this case, the bandwidth control is executed as in the above case so as not to impair user's convenience. Note that the immediate update process may be executed in place of the background update process even if the urgent level of the latest pattern file is low, in the case where the size of the latest pattern file is tiny.

In this embodiment, the terminal 101 checks the communication bandwidth. Alternatively, the access point 102 may check the communication bandwidth and inform the terminal 101 of it.

In this embodiment, an update process plan is automatically selected. More preferably, a mode that allows a user to select a mode after information obtained from the file server 103 is displayed, and a mode that automatically selects a plan on the basis of a threshold value set by the user may be prepared for power users.

Also, a message indicating that the update process of the pattern file is in progress is preferably sent to the user so as not to impair user's convenience.

As described above, according to the third embodiment, since the pattern file update process plan is determined based on detailed information such the urgent level of the pattern file, high-level security measures can be taken without impairing user's convenience.

Fourth Embodiment

Figure 7:
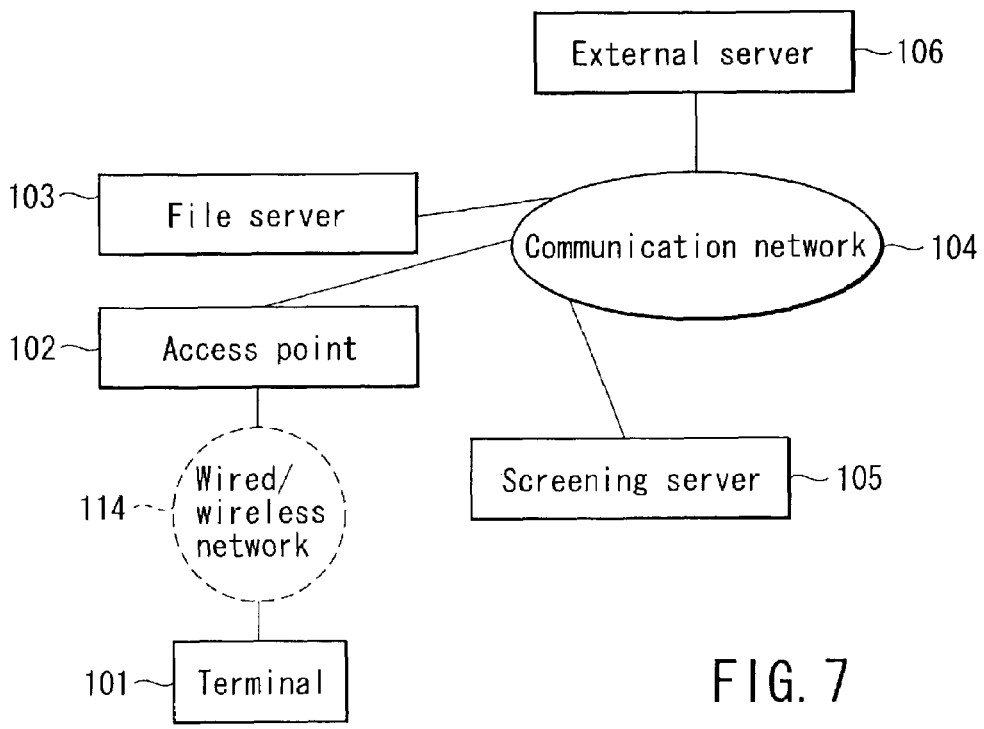
FIG. 7 is a block diagram for explaining the arrangement of a communication system of the fourth embodiment.

With reference now to FIG. 7, there is depicted a block diagram for explaining the arrangement of a communication system according to the fourth embodiment of the present invention.

A communication system according to the fourth embodiment comprises a screening server 105 and external server 106, in addition to the arrangement shown in FIG. 1.

Since the communication system according to this embodiment is similar to the arrangement of the communication system of the second embodiment, only differences will be explained.

The screening server 105 is a server on which a program that analyzes input communication packets to remove viruses, and outputs virus-free packets runs.

The external server 106 is a computer which communicates with the terminal 101 like an HTTP (Hypertext Transfer Protocol) server, FTP (File Transfer Protocol) server, but may often be a computer terminal which may be operated by a cracker to make malicious access to the terminal 101.

Figure 8:
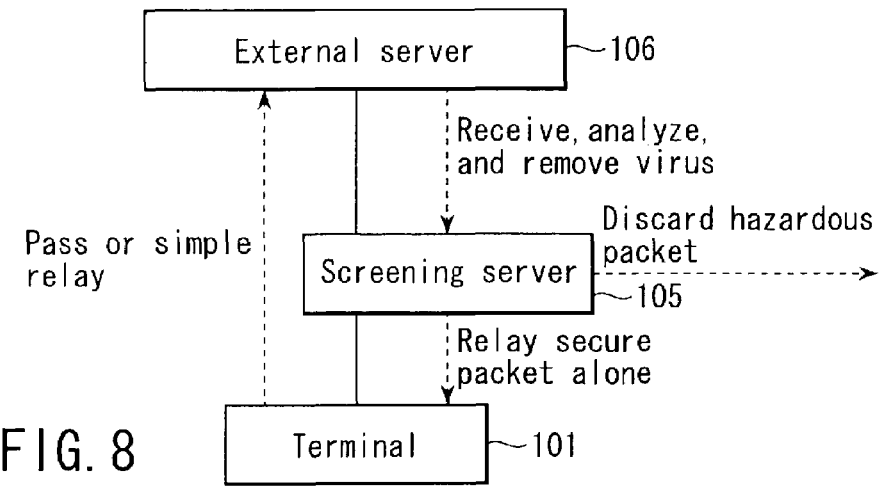
FIG. 8 is a diagram for explaining communications between a terminal and external server via a screening server in the communication system of the fourth embodiment.

The operation of the screening server 105 will be briefly explained below with reference to FIG. 8. FIG. 8 depicts flow of packets between the terminal 101, the screening server 105, and the external server 106.

The terminal 101 communicates with the external server 106 via the screening server 105. In general, since outgoing packets from the terminal 101 to the external server 106 do not influence the security of the terminal 101 itself, they can be directly sent to the external server 106 without the intervention of the screening server 105, or the screening server 105 can simply relay them like a normal Proxy server or router.

In contrast, outgoing packets from the external server 106 to the terminal 101 may influence the security of the terminal 101. Hence, the screening server 105 temporarily receives such packets and analyzes them to see if hazardous data such as a virus is contained. If such data is contained, the server 105 removes it or discards a packet itself. Then, the server 105 sends only secure packets to the terminal 101.

It is preferable that the user can determine whether a communication between the terminal 101 and the external server 106 goes through the screening server 105. During communications via the screening server 105, all packets sent from external computers to the terminal 101 are temporarily received by the screen server 105, and are re-sent to the terminal 101 after a virus are removed from these packets.

To construct a local communication path between the terminal 101 and screening server 105, a technique such as MobileIP (see IETF (Internet Engineering Task Force) RFC2002) that implements mobility may be used. Using MobileIP, packets which are headed from the terminal 101 to the external server 106 directly reach the external server 106 without the intervention of the screening server 105, but packets which are headed from the external server 106 to the terminal 101 reach the terminal 101 via the screening server 105.

Figure 9:
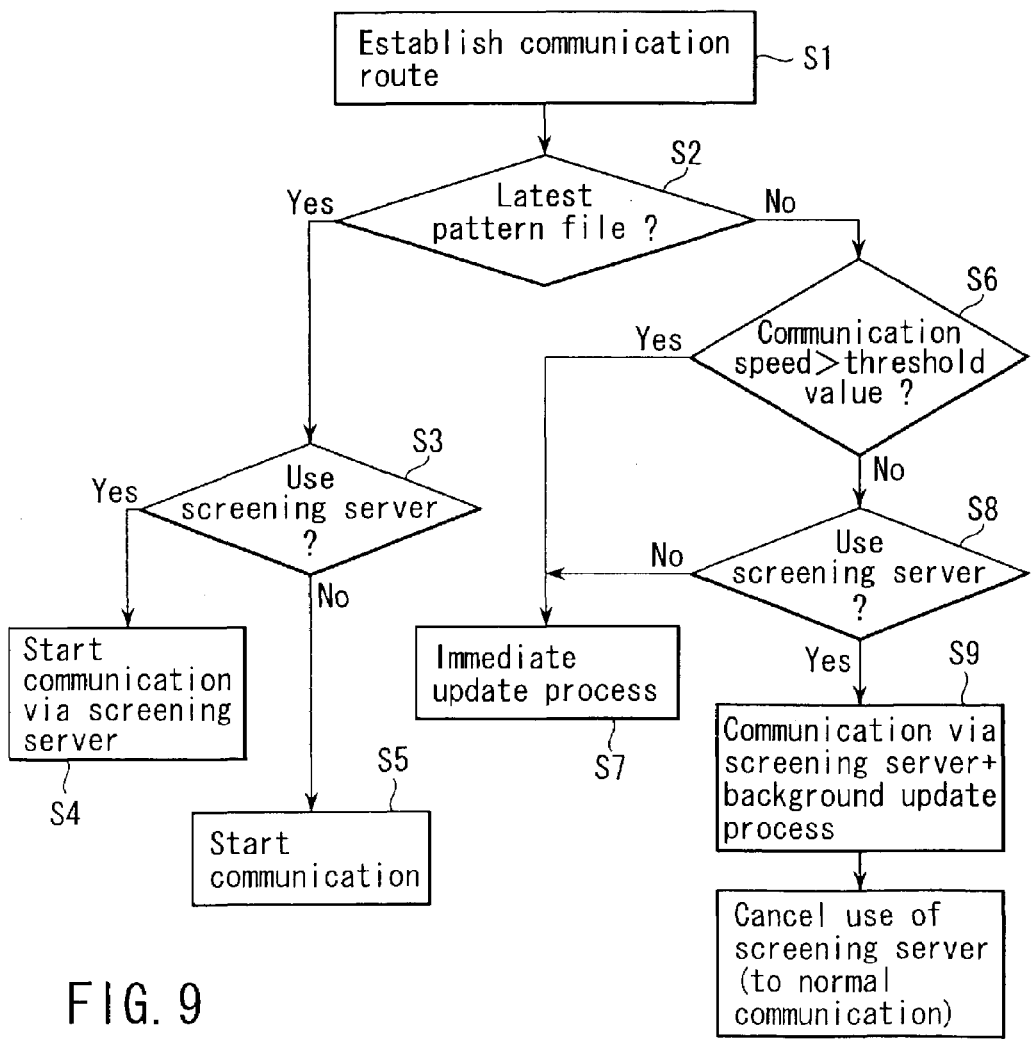
FIG. 9 is a flow chart of a pattern file update process in the terminal in the communication system of the fourth embodiment.

FIG. 9 depicts a flow chart for explaining the pattern file update process in this embodiment.

This embodiment supports communications via the screening server 105 unlike the above described first, second, and third embodiments.

As in the second embodiment, the terminal 101 establishes a communication with the access point 102 (step S1), and checks if its pattern file has the latest version (step S2). If it is determined that the pattern file is not the latest one, the terminal 101 checks the communication speed between the terminal 101 and the access point 102, and determines a pattern file update process plan.

If it is determined in step S2 that the pattern file is the latest one, no pattern file update process is required. However, a communication via the screening server 105 may be made if very high security is required. Thus, the terminal 101 displays a message on the screen to prompt the user to select if the screening server 105 is used (step S3). If the user selects "use", the terminal 101 initiates a communication via the screening server 105 (step S4); if he or she selects "not use", the terminal 101 initiates a normal communication during which the screening server 105 is not used (step S5).

If the pattern file in the terminal 101 is not the latest one, it must be updated. Hence, the terminal 101 checks the communication speed with the access point 102 (step S6).

If the communication speed is larger than a predetermined threshold value, the terminal 101 executes an immediate update process (step 7), and starts communications by other programs after completion of the pattern file update process.

If the communication speed is smaller than the predetermined threshold value, the terminal 101 displays a message on a screen to prompt the user to select if the screening server 105 is used (step S8). If the user selects "use", the terminal 101 executes a background update process, and makes other communications which are made during the pattern file update process via the screening server 105 (step S9). Note that, the immediate update process may be executed in place of the background update process even if the communication speed is equal to or smaller than the predetermined threshold value, in the case where the size of the latest pattern file is tiny.

If the user selects "not use", the terminal 101 executes an immediate update process (step S7) to assure security, and starts communications by other programs after completion of the pattern file update process.

In this embodiment, when the communication speed is equal to or smaller than the predetermined threshold value, the terminal prompts the user to select if the screening server 105 is used. Alternatively, the screening server 105 may be forcibly used without asking the user. Also, whether or not the screening server 105 is used may be automatically determined based on the urgent level of the pattern file. If the urgent level is low, a background update process may be executed without using the screening server 105.

When the screening server 105 is used, all packets sent to the terminal 101 are to be analyzed. Alternatively, only packets associated with mail messages such as POP (Post Office Protocol), IMAP (Internet Message Access Protocol), SMTP (Simple Mail Transfer Protocol), may be analyzed.

In this embodiment, the terminal 101 and screening server 105 are connected via a local communication route, but may be connected via a physical connection. For example, the access point 102 may have a function of the screening server 105.

According to this embodiment, even when the pattern file update process takes time, a communication can be immediately made while assuring security, and a secure communication can be realized without impairing user's convenience.

In the first, second, third, and fourth embodiments of the present invention, the terminal 101 checks if the pattern file is to be updated, and determines a pattern file update process plan. Alternatively, the file server 103 or access point 102 may make such determination, and may send an instruction to the terminal 101. In this way, by determining a process plan by a common server other than the terminal 101, the security of the terminal 101 can be maintained independently of the user.

In this case, in place of the process in which the terminal 101 checks the latest version of the pattern file in the first, second, third, and fourth embodiments, the file server 103 is informed of the version number of the pattern file currently installed in the terminal 101 and the communication speed between the terminal 101 and access point 102. The file server 103 then determines the necessity of version up and an update process plan if version up is required on the basis of the received information, and replies the determined contents to the terminal 101.

In the second, third, and fourth embodiments of the present invention, the terminal 101 checks the communication speed. Alternatively, the access point 102 may check the communication speed, and inform the terminal 101 of it.

Furthermore, in the second, third, and fourth embodiments of the present invention, an update process plan is determined in accordance with the communication speed between the terminal 101 and access point 102. However, the present invention is not limited to this. For example, an update process plan may be determined in accordance with the communication speed between the terminal 101 and, e.g., the file server 103. In this case, either the terminal 101 or file server 103 may check the communication speed.

In the first, second, third, and fourth embodiments of the present invention, the pattern file update process of the anti-virus program has been explained. However, the present invention is not limited to this, and can be applied to version up of the anti-virus program itself which runs on the terminal 101, and also downloading a patch that fixes bugs of an OS and application software.

In the second, third, and fourth embodiments of the present invention, an update process plan is determined in consideration of the communication speed (bandwidth). However, upon determining an update process plan, the connected location of the terminal 101 may be considered in addition to the communication speed.

For example, a case will be examined below wherein the terminal 101 has both the functions of a wireless LAN terminal and portable phone. If the terminal 101 is connected as a portable phone, since the communication bandwidth is narrow and high communication cost of, e.g., packet communications is required, download is preferably suppressed. On the other hand, if the terminal 101 can be connected as a wireless LAN terminal, since the communication bandwidth is broad and low communication cost is required, download is preferably selected. In this way, high-level security measures can be taken while reducing the communication cost, without impairing user's convenience upon updating the pattern file.

For example, a case will be examined below wherein a service that links an attraction in an amusement center such as a playpark with contents such as video, music, to be distributed to a terminal via a wireless communication is to be received. In order to suppress the deviation between the attraction and the contents distribution timing, download of the pattern file is preferably suppressed. As a practical suppression method, for example, a method of setting a high threshold value (communication bandwidth, evaluation criterion of urgent level of a pattern file) used to determine if a pattern file is to be downloaded, a method of forcing to use a screening server, may be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. In a communication system including a first network on which a file server and an access point are connected via a first communication link and a second network on which the access point and a terminal are connected via a second communication link, wherein the terminal establishes a connection with the access point to access a file on the file server, a download control method comprising:
   accessing from the terminal to the file server through the access point to request the file;
   selecting a download process from one of a foreground process, background process and postponement process;
   executing the download process to download the file from the file server to the terminal;
   detecting a communication speed over the second communication link; and
   selecting the download process according to the communication speed, wherein if the communication speed is faster than a predetermined threshold value, the foreground process is selected and if the communication speed is slower than the predetermined threshold value, the background process is selected.

2. In a communication system including a first network on which a file server and an access point are connected via a first communication link and a second network on which the access point and a terminal are connected via a second communication link, wherein the terminal establishes a connection with the access point to access a file on the file server, a download control method comprising:
   accessing from the terminal to the file server through the access point to request the file;
   selecting a download process from one of a foreground process, background process and postponement process;
   executing the download process to download the file from the file server to the terminal;
   monitoring during the background process, a use ratio of a bandwidth assured for communications by other programs in the terminal; and
   controlling a bandwidth assured for the background process depending on the use ratio.

3. In a communication system including a first network on which a file server and an access point are connected via a first communication link and a second network on which the access point and a terminal are connected via a second communication link, wherein the terminal establishes a connection with the access point to access a file on the file server, a download control method comprising:
   accessing from the terminal to the file server through the access point to request the file;
   selecting a download process from one of a foreground process, background process and postponement process;
   executing the download process to download the file from the file server to the terminal;
   determining a download process from one of a foreground process, background process and postponement process by the file server;
   instructing the terminal to execute the download process for a file to be downloaded to the terminal; and
   detecting a communication speed between the file server and the terminal over the first communication link and the second communication link by the file server.

4. In a communication system including a first network on which a file server and an access point are connected via a first communication link and a second network on which the access point and a terminal are connected via a second communication link, wherein the terminal establishes a connection with the access point to access a file on the file server, a download control method comprising:
   accessing from the terminal to the file server through the access point to request the file;
   selecting a download process from one of a foreground process, background process and postponement process;
   executing the download process to download the file from the file server to the terminal;
   determining a download process from one of a foreground process, background process and postponement process by the access point;
   instructing the terminal to execute the download process for a file to be downloaded to the terminal which is stored in the file server; and
   detecting a communication speed between the access point and the terminal over the second communication link by the access point.

5. A communication system comprising:
   a first network on which a file server and an access point are connected via a first communication link, the file server storing a file; and
   a second network on which the access point and a terminal are connected via a second communication link, wherein the terminal establishes a connection with the access point to access the file server, wherein the terminal accesses the file server through the access point to request the file, selects a download process from one of a foreground process, background process and postponement process, and executes the download process to download the file from the file server;

the terminal detects a communication speed over the second communication link, and the terminal selects the download process according to the communication speed so that if the communication speed is faster than a predetermined threshold value, the foreground process is selected and if the communication speed is slower than the predetermined threshold value, the background process is selected.

6. A communication system comprising:

a first network on which a file server and an access point are connected via a first communication link, the file server storing a file;

a second network on which the access point and a terminal are connected via a second communication link, wherein the terminal establishes a connection with the access point to access the file server, wherein the terminal accesses the file server through the access point to request the file, selects a download process from one of a foreground process, background process and postponement process, and executes the download process to download the file from the file server, the terminal monitors, during the background process, a use ratio of a bandwidth assured for communications by other programs, and the terminal controls a bandwidth assured for the background process depending on the use ratio.

7. A communication system comprising:

a first network on which a file server and an access point are connected via a first communication link, the file server storing a file; and a second network on which the access point and a terminal are connected via a second communication link, wherein the terminal establishes a connection with the access point to access the file server, wherein the terminal accesses the file server through the access point to request the file, selects a download process from one of a foreground process, background process and postponement process, and executes the download process to download the file from the file server, the file server determines a download process from one of a foreground process, background process and postponement process, the file server instructs the terminal to execute the download process for a file to be downloaded to the terminal, and the file server detects a communication speed between the file server and the terminal over the first communication link and the second communication link.

8. A communication system comprising:

a first network on which a file server and an access point are connected via a first communication link, the file server storing a file; and a second network on which the access point and a terminal are connected via a second communication link, wherein the terminal establishes a connection with the access point to access the file server, wherein the terminal accesses the file server through the access point to request the file, selects a download process from one of a foreground process, background process and postponement process, and executes the download process to download the file from the file server, the access point determines a download process from one of a foreground process, background process and postponement process, the access point instructs the terminal to execute the download process for a file to be downloaded to the terminal, which is stored in the file server, and the access point detects a communication speed between the access point and the terminal over the second communication link.

* * * * *